United States Patent
Lemaitre et al.

[11] Patent Number: 6,031,482
[45] Date of Patent: Feb. 29, 2000

[54] METHOD AND SYSTEM FOR SENSING AND LOCATING A PERSON, E.G. UNDER AN AVALANCHE

[75] Inventors: François Lemaitre, St-Orens de Gameville; Jean-Claude Poussieres, Ramonville St Agne, both of France

[73] Assignee: Office National d'Etudes et de Recherches Aerospatiales (ONERA), Chatillon, France

[21] Appl. No.: 09/091,662

[22] PCT Filed: Dec. 20, 1996

[86] PCT No.: PCT/FR96/02051

§ 371 Date: Aug. 26, 1998

§ 102(e) Date: Aug. 26, 1998

[87] PCT Pub. No.: WO97/23786

PCT Pub. Date: Jul. 3, 1997

[30] Foreign Application Priority Data

Dec. 22, 1995 [FR] France .................................. 95 15360

[51] Int. Cl.[7] .............................. G01S 13/04; G01S 13/06
[52] U.S. Cl. ................................ 342/22; 342/27; 342/28
[58] Field of Search .................... 342/22, 27, 28

[56] References Cited

U.S. PATENT DOCUMENTS

| | | | |
|---|---|---|---|
| 3,614,779 | 10/1971 | Sommer et al. | 343/6 |
| 3,832,709 | 8/1974 | Klein et al. | 342/127 |
| 4,400,700 | 8/1983 | Rittenbach | 343/55 |
| 4,890,111 | 12/1989 | Nicolet et al. | 342/51 |
| 4,958,638 | 9/1990 | Sharpe et al. | 128/653 |
| 5,420,589 | 5/1995 | Wells et al. | 342/22 |
| 5,448,501 | 9/1995 | Hablov et al. | 364/517 |
| 5,530,429 | 6/1996 | Hablov et al. | 340/552 |
| 5,614,908 | 3/1997 | Phelan et al. | 342/33 |
| 5,790,032 | 8/1998 | Schmidt | 340/573 |

OTHER PUBLICATIONS

Chuang et al., "Microprocessor-Controlled Automatic Clutter-Cancellation Circuits for Microwave Systems to Sense Physiological Movements Remotely Through the Rubble", Feb. 13, 1990, Proceedings of the Instrumentation and Measurement Technology Conference, San Jose, pp. 177–181.

*Primary Examiner*—John B. Sotomayor
*Attorney, Agent, or Firm*—Jacobson, Price, Holman & Stern PLLC

[57] ABSTRACT

An electromagnetic method for detecting and/or locating a person constituting a non-cooperative target, in which an electromagnetic signal is transmitted (1) in the vicinity of a search zone (N), and the signal returned by said zone (N) is detected (2) in the vicinity thereof, the method being characterized in that transmission and reception are performed by means of at least two distinct antennas, each signal obtained in this way is filtered by a lowpass or a bandpass filter (12) so as to extract therefrom components corresponding to human movement, and in that each filtered signal obtained in this way is processed (14) to deduce therefrom the presence of a person and/or to locate that person. The system enables the method to be implemented. Application to locating avalanche victims.

10 Claims, 2 Drawing Sheets

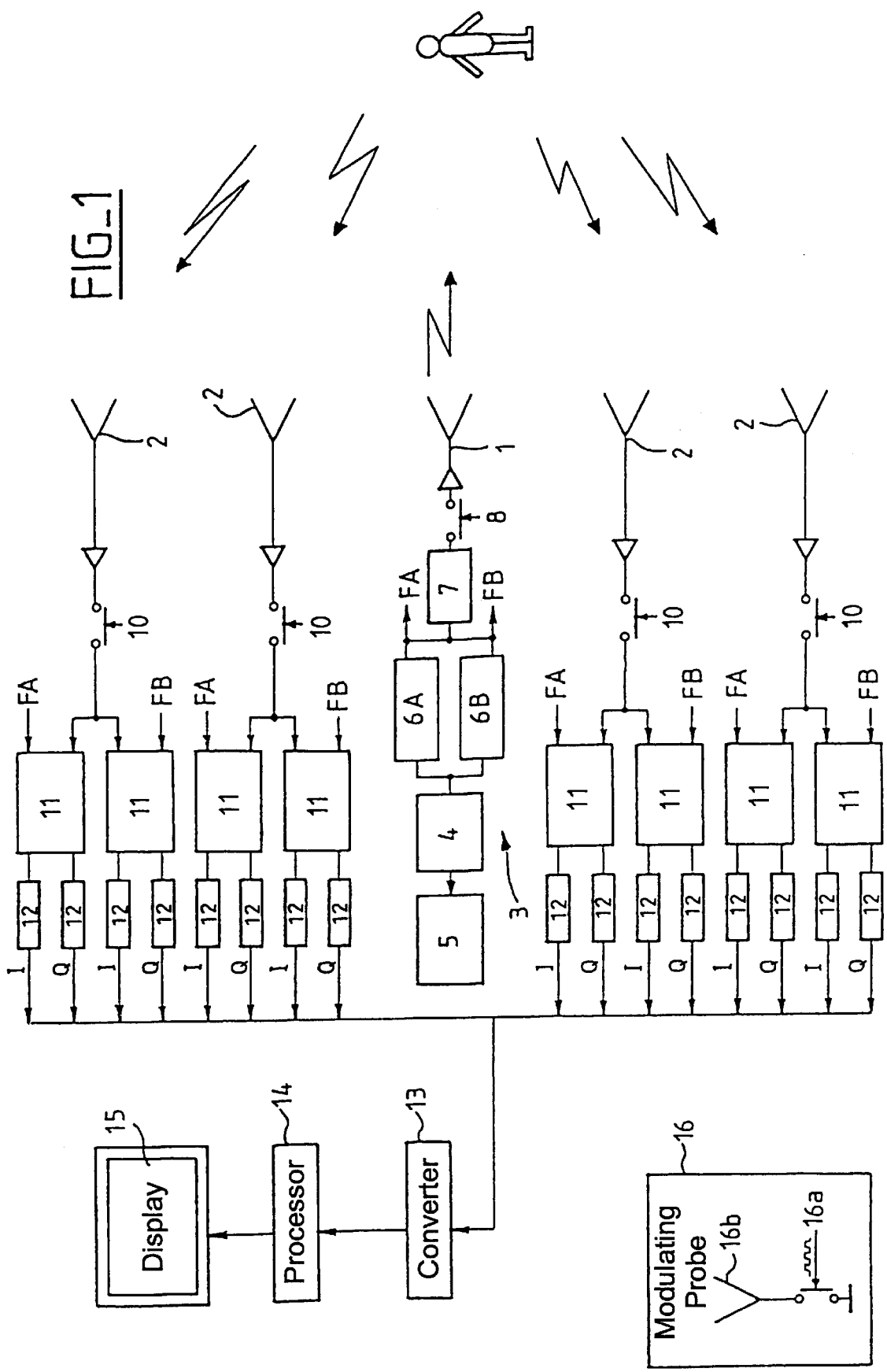

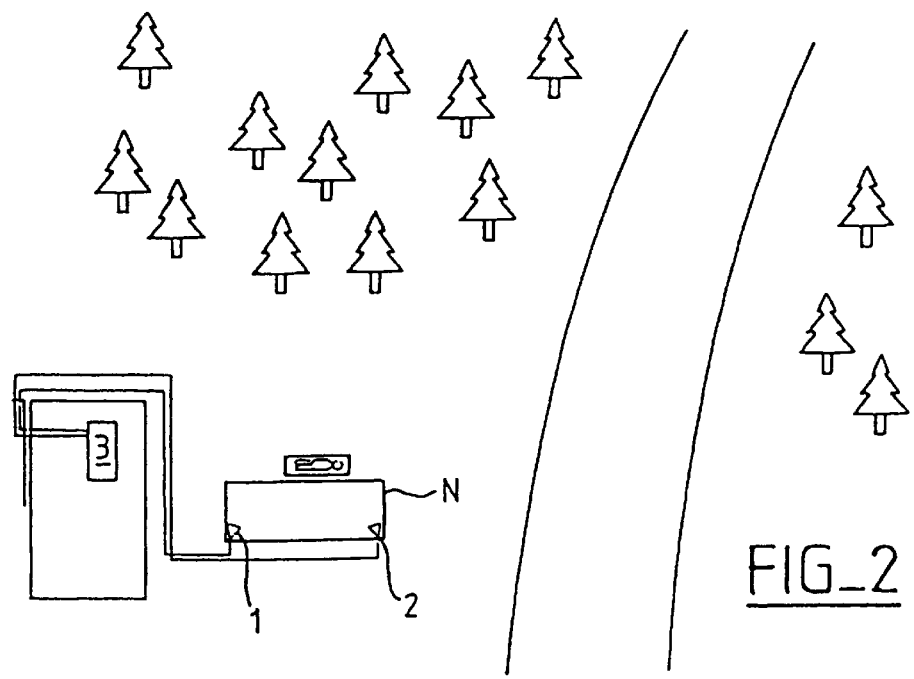
FIG_2
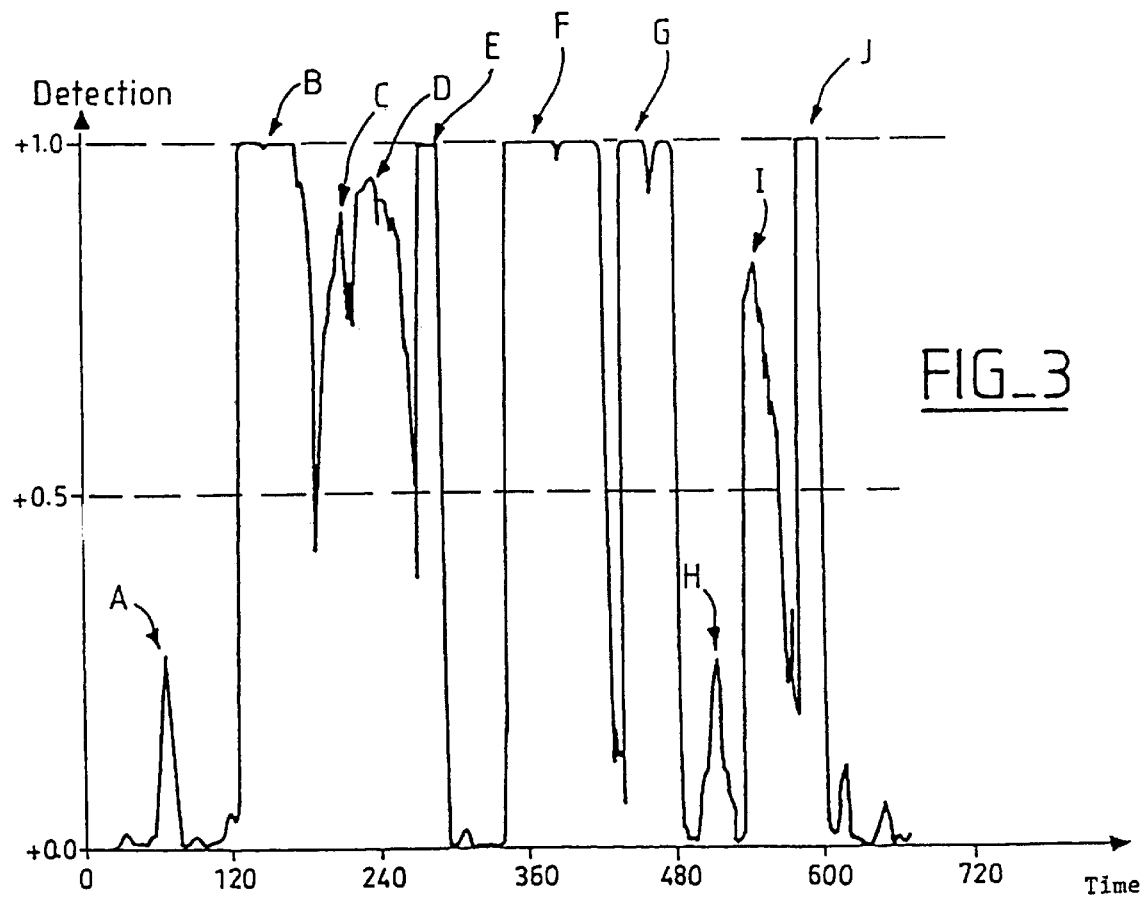
FIG_3

METHOD AND SYSTEM FOR SENSING AND LOCATING A PERSON, E.G. UNDER AN AVALANCHE

BACKGROUND OF THE INVENTION

1. Field of the Invention

The present invention relates to electromagnetic methods and systems for detecting and/or locating individual people.

A particularly advantageous application lies in searching for avalanche victims.

Naturally other applications can be contemplated for the invention.

In particular, the invention applies to any detection and/or locating of a person hidden by an opaque obstacle and could for instance also be used when searching for people buried under rubble.

2. Description of the Related Art

Numerous systems for detecting and locating victims buried under avalanche debris are already known.

In particular, it has already been proposed to equip skiers with chemical beacons enabling them to be scented by search dogs. In this respect, reference can be made to French patent application FR 2 677 890.

Systems implementing electromagnetic transmission and reception have also been proposed.

Particular mention can be made of the ARVA system which is in particularly widely used in France (ARVA is a French acronym for assistance in searching for avalanche victims). In that system, skiers carry locating beacons that transmit at a frequency of 457 kHz.

Systems are also known such as the system sold in France under the name RECO, in which the garments of skiers are fitted with transmission dipoles designed, when subjected to electromagnetic illumination, to transmit at around 1.8 GHz.

Those various detection systems suffer from the major drawback of being capable of operating only if the person for whom a search is being made is provided with a beacon or a special transmission device; under such circumstances, a person is said to constitute a "cooperative" target.

Unfortunately, it still happens frequently that the people who have been buried are not so equipped, either because of their own imprudence, or because of poor evaluation of avalanche risk.

In addition, with a beacon, it is necessary for the beacon to be activated by the person concerned before becoming trapped in an avalanche.

An object of the invention is to offset those drawbacks.

A device for detecting the presence of a person hidden by an obstacle by transmitting and receiving microwaves is already known from the following publication:

"Microprocessor-controlled automatic clutter-cancellation circuits for microwave systems to sense physiological movements remotely through rubble", H. R. Chuang, et al., Feb. 13, 1990, San Jose, Feb. 13–15, 1990, pp. 177–181, IEEE.

Another device of that type has also been proposed in U.S. Pat. No. 5,448,501.

Nevertheless, both of those publications propose transmission and reception of monostatic type, i.e. using the same antenna.

Unfortunately, one of the main difficulties in detecting the internal movements of a person (breathing, heart beats) by transmitting and receiving microwaves is the very large energy ratio between the fixed echo due to the environment around the person, i.e. the "clutter", and the modulation induced by that person's own movements. Typically, this ratio is of the order of 100 dB. Also, a contribution to the clutter which is at least equal to if not greater than the signal that is to be detected comes from antenna matching which reinjects a fraction of transmitted power into the reception system (at best 1/10th of the transmitted power).

As a result, with monostatic systems, received signals cannot be processed directly since the clutter would otherwise be heavily saturating, so it is necessary to implement techniques for eliminating the clutter, e.g. by neutrodyning.

This gives rise to receiver electronics that are particularly complex.

BRIEF DESCRIPTION OF THE INVENTION

The invention proposes detecting and/or locating the presence of a person by transmitting and receiving an electromagnetic wave, which can be implemented using particularly simple electronics.

To this end, the invention uses an architecture in which the transmit and receive antennas are separate, such that direct coupling between them is low, making it possible to process received signals directly in order to filter out the clutter.

Thus, the invention provides an electromagnetic method for detecting and/or locating a person constituting a non-cooperative target, in which an electromagnetic signal is transmitted in the vicinity of a search zone, and the signal returned by the person is detected in the vicinity of said zone, the method being characterized in that said transmission and reception are implemented by means of at least two distinct antennas;

in that each signal obtained in this way is filtered by a lowpass or bandpass filter so as to extract therefrom components corresponding to movement of a human; and each signal obtained in this way is processed to deduce therefrom the presence of a person and/or to locate the person.

Another object of the invention is to propose a method of this type which makes it possible to locate a person.

At least one modulating probe which generates a virtual echo at a frequency different from that of human movement is placed on the search zone, a signal corresponding to said virtual echo is detected in the vicinity of the search zone, the virtual echo signals obtained in this way are processed in the same manner as the filtered return signals, and the parameters resulting from the processing of the virtual echo signals and the parameters resulting from processing of the filtered return signals are compared to locate said person.

When the invention is applied to searching for avalanche victims, the frequency of the carrier of the transmitted electromagnetic signal preferably lies in the range 500 MHz to 1000 MHz.

This frequency band corresponds to the best frequencies for radar detection through a covering of snow: at higher frequencies the waves are strongly attenuated by snow; at lower frequencies, the useful signal becomes too weak to make detection easy.

The invention also provides a system for implementing the method.

BRIEF DESCRIPTION OF THE DRAWINGS

Other characteristics and advantages of the invention appear further from the following description. The description is purely illustrative and non-limiting. It should be read with reference to the accompanying drawings, in which:

FIG. 1 shows a detecting and locating system constituting a possible embodiment of the invention;

FIG. 2 is a diagram of detection performed in accordance with the invention; and FIG. 3 is a graph on which the power delivered by the detection antenna as measured during the experiment illustrated by FIG. 2 is plotted as a function of time.

DETAILED DESCRIPTION OF THE INVENTION

The detecting and locating system shown in FIG. 1 is a two-frequency multistatic pulse radar.

The system includes a transmit antenna 1 and a plurality of receive antennas 2. It also includes means given overall reference 3 for generating a signal that is be radiated by the antenna 1, and for demodulating and processing the signals received by the antennas 2.

The receive antennas 2 are distributed, for example, in a line so as to form one or more interferometer pairs in front of the snow cover that is being searched. In this example, there are four antennas 2, with two successive antennas being spaced apart by a distance lying in the range 0.5 meters (m) to 1 m.

Naturally, other dispositions are possible for the antennas 1 and 2. In particular, the disposition of the antennas 1 and 2 is advantageously adapted to the type of snow deposit being searched.

Also, according to an advantageous characteristic of the invention, the transmit and receive antennas 1 and 2 are stuck directly into the snow.

This prevents them from moving.

In addition, precautions are taken to avoid the need for the electromagnetic waves to cross air/snow interfaces since they constitute surfaces that are liable to give rise to large losses of power.

To this end, the antennas 1 and 2 are circuits printed on an epoxy resin substrate, thus making them quite strong and giving them a plane structure that is easy to stick into the snow.

These transmit and receive antennas 1 and 2 are also advantageously antipodal slot antennas, e.g. flared slot antennas of the VIVALDI type.

It is known that with such an antenna structure, the electromagnetic field is generated inside the slots. Consequently, transmission and reception by antennas of this type are not distributed by the presence of drops of water on the surface of the antenna.

The means 3 include a reference oscillator 4 driving both a synchronization generator 5 and frequency synthesizers 6A and 6B.

The synthesizers 6A and 6B generate sinusoidal voltages at frequencies FA and FB which correspond to the transmit and receive frequencies of the system.

By way of example, these frequencies FA and FB are 750 MHz and 780 MHz, with the oscillator 4 oscillating at a frequency of 60 MHz.

For transmission via the antenna 1, the means 3 include a summing circuit 7 on which the signals output by the synthesizers 6A and 6B are applied so as to be mixed, followed by a modulation gate 8 through which the signals output by the summing circuit 7 are sent prior to being radiated by the antenna 1.

The modulation gate 8 is controlled by the synchronization generator 5. It modulates the mixed signals into a repetitive pulse train, with pulses having a duration of 33 ns and a form factor of $\frac{1}{16}$.

Each of the various reception channels at the outputs from the antennas 2 comprises a gate 10 and a pair of mixers 11 to perform in-phase and quadrature demodulation of signals at the frequencies FA and FB as received by the antennas 2.

The gates 10 are controlled by the synchronization generator so as to open reception windows that are 33 ns wide and that are offset in steps of 16 ns relative to the modulation gate 8.

At the outputs from the mixers 11, the in-phase and quadrature signals are filtered by bandpass filters 12 for extracting the non-static components from the received signals, which components correspond to the movements that are to be detected (breathing movement, limb movements, etc.).

For this purpose, the passband of these filters 12 lies advantageously in the range 0.03 Hz to 3 Hz.

The in-phase and quadrature signals I and Q as filtered in this way are then digitized by an analog-to-digital converter 13 and then applied to a processor unit 14 which processes the signals to deduce information therefrom concerning detecting and/or locating a person buried under a cover of snow.

The system also includes a display unit 15 whereby said information can be displayed to operators.

Naturally, in order to ensure that the presence of the operators is not detected, they ensure they are several tens of meters away from the search zone and the transmit and receive antennas 1 and 2.

There follows a description of an example of simple processing that can be implemented by the processor unit 14 on the eight complex signals it receives.

To detect the presence of a living person hidden under snow, i.e. to detect the non-static components of the signals returned to the antennas 2, the processor unit 14 calculates, for each antenna 2, each frequency FA, FB, and each detection window, the mean value of the conjugate product $Sa_k(t) \cdot Sa_k(t)^*$ over a time interval of about 10 seconds, where $Sa_k(t)$ is the time signal output by the filters 12 and the received channel corresponding to antenna k.

The conjugate product is compared with a threshold. An antenna 2 has detected the presence of a person when the mean value of the conjugate product is greater than the threshold.

To limit false alarms, the detection is confirmed by calculating the variance of the various conjugate products corresponding to the eight reception channels and this variance is compared with a threshold. This provides an overall detection criterion which takes account of reception over the various channels.

This detection can also be confirmed by calculating cross-correlation coefficients between the signals on the various channels and at the various frequencies and by analyzing said coefficients to estimate the likelihood of an event. For example, it is verified that the signals corresponding to two adjacent antennas are indeed correlated.

The cross-correlation coefficients form the estimated covariance matrix whose Eigen value(s) is/are calculated. These Eigen values serve to combine the eight channels in coherent manner to form one or more channels which have the property of offering maximum sensitivity to the sources of movement that have given rise to the detection signal.

It will be observed that this confirmation procedure is possible only because the movements being detected, such as the breathing movements of the victim, are naturally uninterrupted and are located in a stable position.

To locate the person corresponding to the detected non-static component, it is possible for each reception window, each pair of antennas (i, j), and for each frequency FA, FB to calculate the phase shift $$T_{ij}=\arg(Sa_i(t).Sa_j^*(t))$$

which corresponds to the geometrical bearing of the person relative to the antenna pair i, j.

It is also possible for each reception window and for each antenna k to calculate the argument $$D_k=\arg(<S_{kFA}(t).S_{kFB}^*(t)>)$$

where <> means "the mean value of",
which corresponds to the phase shift between the signals output by the channels at the frequencies FA and FB for the antenna k and which conveys information concerning the total distance: antenna $1_{13}$ person$_{13}$ antenna k.

The parameters $T_{i,j}$ and $D_k$ obtained in this way would be redundant if it could be assumed that the propagation medium is uniform.

However, one of the problems that arises very particularly in a medium such as a covering of snow stems from the fact that it is not uniform.

A covering of snow is made up of a plurality of successive deposits of different densities and different dielectric properties, and in avalanche debris they are jumbled up and modified. The propagation medium also includes cavities of varying sizes, together with inclusions of rocks, tree trunks, earth, etc. . . . and the same can also apply to a propagation medium that is the result of an earthquake.

To solve this difficulty, a modulating probe 16 is moved over the search zone, with the probe serving to generate a virtual echo at a frequency which is high enough to avoid confusion with the frequency of a natural movement.

At the outputs from the mixers 11, the system includes means (not shown in FIG. 1 to avoid overcrowding it) for transmitting to the processor unit 14 the demodulated signals that correspond to said virtual echo.

The processor unit 14 calculates the parameters $T_{i,j}$ and/or $D_k$ of said virtual echo and the operator moves the probe 16 so as to cause these parameters to converge on those which correspond to returns from the person being located. In the final position, the probe coincides with the victim.

By way of example, the modulating probe 16 can be constituted by a dipole which is closed in alternation on an open circuit and on a short circuit at a frequency of 40 Hz.

It is also possible, instead of moving the probe over the search zone, to lay out a grid of modulating probes 16 over the search zone with each probe transmitting at a different frequency.

Naturally, processing other than that described above could also be envisaged.

In particular, filter processing can be provided for improving contrast between the useful signal and interfering signals by using all of the spectral characteristics of said signals.

The invention is described above in the example of a two-frequency multistatic pulse radar, however it naturally applies in the same manner to any radar detection and in particular to radar detection using continuous waves and/or radar that is single-frequency or multi-frequency.

For a general description of radar techniques, reference can advantageously be made to the work: "Principes de traitement des signaux radar et sonar" [Principles of radar and sonar signal processing] by F. Le Chevalier, Masson, 1989, the teaching of which is included herein by reference.

An implementation of the invention is shown in FIGS. 2 and 3.

In this implementation, detection was performed from behind a wall of snow N, as shown in FIG. 2.

The wall of snow N was approximately 2 m high, 5.20 m wide, and 3.60 m thick.

It was made of fresh snow and old snow that was dirty to a greater or lesser extent, with the kinds of snow being mixed together and compressed in part by machinery.

Detection was performed by a receive antenna 2 placed on the same side of the wall N as the transmit antenna 1.

Various events took place behind the wall N and were detected by the antenna 2.

The time chart of FIG. 3 shows the output power taken from the channels of antenna 2 corresponding to non-static echoes received by said antenna 2.

The power peaks that appear from the chart coincide well with the various events which took place behind the wall N:

between 0 and 120 s, there was nobody behind the wall N, but the passage of a skier in the distance was observed (peak A);

between 130 s and 180 s, a person took up a standing position behind the wall (peak B);

between 180 s and 220 s, that person stood as still as possible, but breathing movements continued to be detected (peak C);

between 220 s and 270 s, the person moved one hand (peak D);

between 270 s and 290 s, the person moved away (peak E);

between 340 s and 420 s, a stretcher was put down at the foot of the wall (peak F);

between 420 s and 480 s, a person lay down on the stretcher (peak G);

between 480 s and 520 s, that person moved one hand (peak H);

between 520 s and 580 s, that person breathed strongly six times (peak I); and between 580 s and 600 s, that person stood up (peak J).

It can be seen from this example that the invention makes it possible to discriminate clearly between echoes coming from a moving person, and echoes due to the static environment.

It is thus possible to detect the breathing or small movements of a person caught under an avalanche.

It will also be observed that with an operating frequency lying in the range 500 MHz to 1000 MHz, the invention makes it possible to detect a victim under 10 meters of snow, whereas traditional searches using poles are limited to a depth of 6 meters.

We claim:

1. An electromagnetic method for detecting a person constituting a non-cooperative target, in which an electromagnetic signal is transmitted (1) in the vicinity of a search zone (N), the signal returned by the person is detected (2) in the vicinity of said zone (N), each signal obtained in this way is filtered by a bandpass filter (12) so as to extract therefrom components corresponding to movement of a human, and each signal obtained in this way is processed (14) to deduce therefrom the presence of a person, the method being characterized in that to locate a person, said transmission and reception are implemented by means of at least two distinct antennas, in that at least one modulating probe (16) which generates a virtual echo at a frequency different from that of human movement is disposed on the search zone, a signal corresponding to said virtual echo is detected in the vicinity of the search zone, the virtual echo signals obtained in this way are processed in the same manner as the filtered return signals, and the parameters resulting from the processing of the virtual echo signals and the parameters resulting from processing of the filtered return signals are compared to locate said person.

2. A method according to claim 1, characterized in that a plurality of distinct receive antennas are used for reception, said antennas being distributed in the vicinity of the search zone.

3. A method according to claim 1, characterized in that the passband of the filter lies in the range 0.03 Hz to 3 Hz.

4. A method according to claim 1 for detecting and/or locating a person buried under avalanche debris, the method being characterized in that the frequency of the transmitted electromagnetic signal carrier lies in the range 500 MHz to 1000 MHz.

5. A method according to claim 1, for detecting and/or locating a person buried under avalanche debris, the method being characterized in that the transmit and receive antennas are stuck directly into the snow.

6. An electromagnetic system for detecting a person constituting a non-cooperative target, the system comprising transmitter means (1) for transmitting an electromagnetic signal in the vicinity of a search zone, receiver means (2) for detecting in the vicinity of the search zone, the signal returned thereby, together with a bandpass filter (12) for filtering the signal(s) obtained in this way and for extracting therefrom components corresponding to human movement, and processor means (14) for processing the filtered signal (s) obtained in this way for deducing therefrom the presence of a person, the system being characterized in that said system enables a person to be located, the transmitter and receiver means comprising at least two distinct antennas, the system further including at least one modulating probe (16) which generates a virtual echo at a frequency different from that of human movement, such that the parameters resulting from the processing of the virtual echo signals and the parameters resulting from the return signals are compared to locate said person.

7. A system according to claim 6, characterized in that it has a plurality of distinct receive antennas distributed in the vicinity of the search zone.

8. A system according to claim 6, characterized in that the modulating probe (16) is a dipole that is closed alternately by an open circuit and by a short circuit at a frequency greater than that of the frequencies filtered by the bandpass filter (12).

9. A system according to claim 6, characterized in that the transmit and receive antennas (1, 2) are flared slot antennas of the VIVALDI type.

10. A system according to claim 9, characterized in that the transmit and receive antennas (1, 2) are antipodal slots having a circuit printed on an epoxy resin substrate.

* * * * *